United States Patent [19]

Carpetis

[11] Patent Number: 4,735,053
[45] Date of Patent: Apr. 5, 1988

[54] METHOD OF REMOVING HEAT FROM A REFRIGERATION LOAD AND APPARATUS FOR PERFORMING THIS METHOD

[75] Inventor: Constantin Carpetis, Wolfschlugen, Fed. Rep. of Germany

[73] Assignee: Deutsche Forschungs- und Versuchsanstalt fur Luft- und Raumfahrt e.V., Cologne, Fed. Rep. of Germany

[21] Appl. No.: 914,057

[22] Filed: Oct. 1, 1986

[30] Foreign Application Priority Data

Feb. 10, 1985 [DE] Fed. Rep. of Germany ....... 3535083

[51] Int. Cl.$^4$ .............................................. F25B 9/00
[52] U.S. Cl. .............................................. 62/6; 62/3; 60/520
[58] Field of Search ............... 62/3, 6; 60/517, 520

[56] References Cited

U.S. PATENT DOCUMENTS

| | | | |
|---|---|---|---|
| 3,793,846 | 2/1974 | Dehne | 62/6 |
| 3,921,400 | 11/1975 | Pitcher | 62/6 |
| 4,092,833 | 6/1978 | Durenec | 62/6 |
| 4,471,625 | 9/1984 | Yasukochi et al. | 62/6 |
| 4,514,979 | 5/1985 | Mohr | 62/6 |

FOREIGN PATENT DOCUMENTS 274024 9/1969 Austria .

OTHER PUBLICATIONS

Haselden; G. G., Cryogenic Fundamentals, Academic Press, London, New York, 1971, pp. 74 to 77.
J. Appl. Phys., vol. 49, No. 3, Mar. 1978, pp. 1216 to 1226.
Cryogenics, Oct. 1981, p. 579.
Gifford; W. E., "The Gifford—McMahon Cycle", pp. 152 to 159.
Cryogenics, Aug. 1983, pp. 427 to 432.
Experimental Techniques in Low—Temperature Physics, Clarendon Press, Oxford, 1979, pp. 26 to 29.
Tieftemperaturtechnologie, VDI—Verlag GmbH, 1981, pp. 50 to 54 and 286 to 289.

Primary Examiner—Ronald C. Capossela
Attorney, Agent, or Firm—Wolf, Greenfield & Sacks

[57] ABSTRACT

A method for removing heat from a refrigeration load in a cyclically operating Gifford-McMahon refrigeration apparatus, with which in each cycle a compressed cooling gas from a high-pressure inlet is brought into heat contact with a regenerator cooled during the previous cycle and thereby cooled, the cooling gas is subsequently conveyed to a storage volume via the refrigeration load, the cooling gas is then expanded after closure of the high-pressure inlet by opening a low-pressure outlet and thereby cooled, and the cooling gas is partially conveyed by means of a displacer piston from the storage volume to the low-pressure outlet via the refrigeration load and the regenerator, refrigeration capacity hereby being transferred to the refrigeration load and the regenerator hereby being cooled.

12 Claims, 4 Drawing Sheets

METHOD OF REMOVING HEAT FROM A REFRIGERATION LOAD AND APPARATUS FOR PERFORMING THIS METHOD

The invention relates to a method for removing heat from a refrigeration load in a cyclically operating Gifford-McMahon refrigeration apparatus, with which in each cycle a compressed cooling gas from a high-pressure inlet is brought into heat contact with a regenerator cooled during the previous cycle and thereby cooled, the cooling gas is subsequently conveyed to a storage volume via the refrigeration load, the cooling gas is then expanded after closure of the high-pressure inlet by opening a low-pressure outlet and thereby cooled, and the cooling gas is partially conveyed by means of a displacer piston from the storage volume to the low-pressure outlet via the refrigeration load and the regenerator, refrigeration capacity hereby being transferred to the refrigeration load and the regenerator hereby being cooled.

In addition, the invention relates to an apparatus for performing this method, comprising a closable high-pressure inlet as well as a closable low-pressure outlet for a cooling gas, a regenerator chamber connected on the one hand to the high-pressure inlet and the low-pressure outlet and on the other hand to a storage volume via a refrigeration load, and also comprising a storage chamber divided into two sections by a displacer piston displaceable in this chamber, these sections being sealed from one another and one section forming the storage volume connected to the regenerator chamber while the other section is connected to the high-pressure inlet and the low-pressure outlet.

A method and apparatus of this type are known, for example, from the book Cryogenic Fundamentals by G. G. Haselden, Academic Press, London, New York, 1971, pages 74 et seq. Systems operating in accordance with this method are mechanically very simple in construction but are still very efficient with respect to refrigeration.

The object of the present invention is to improve a method of the type described at the outset still further with respect to its efficiency.

This object is accomplished in accordance with the invention, in a method of the type described at the outset, in that the cooling gas is brought into heat contact with an active magnetic regenerator between the refrigeration load and the storage volume when flowing into this storage volume and also when flowing out of the storage volume, the magnetic substance of the active magnetic regenerator being magnetized when the cooling gas flows into the storage volume but demagnetized when the cooling gas flows out of the storage volume.

This is a combination of a refrigeration according to the Gifford-McMahon principle and an active magnetic refrigeration which is already known per se (J.Appl.-Phys. 49(3), March 1978, pages 1216 et seq.; Cryogenics, October 1981, pages 579 et seq.).

Magnetocaloric refrigeration has previously been demonstrated in laboratory tests. The ferromagnetic substance used is periodically magnetized and demagnetized at a high magnetic field strength, preferably in superconductive coils. The refrigerating effect resulting from demagnetization is supplied to the load whereas the heat resulting accordingly from magnetization has to be removed and conveyed to a negative heat source.

Difficulties arise during the technical realization of this magnetocaloric refrigeration due to the fact that streams of cooling gas have to be diverted, i.e. it is necessary to change over the paths of flow at low temperatures. As a rule, flexible lines have to be used and these also cause considerable practical difficulties at such low temperatures.

On the other hand, the present combination of a magnetocaloric refrigeration with the Gifford-McMahon method facilitates a particularly advantageous conductance of cooling gas in the region of the magnetic substance of the active magnetic regenerators. In this respect, seals and valves are not arranged in the region of the cold gas but in the high-temperature region. This applies both for the closure valves of the high-pressure inlet and low pressure outlet as well as for the seals of the displacer piston for the storage volume. This results in a problem-free construction for a refrigeration machine and, due to the combined refrigeration effect of the Gifford-McMahon method, on the one hand, and the magnetocaloric refrigeration effect, on the other, the efficiency of the machine can also be considerably increased overall.

A further improvement in the inventive method may be achieved in that the cooling gas is brought into heat contact with a second active magnetic regnerator between the refrigeration load and the regenerator when the gas is flowing into the storage volume and also when the gas is flowing out of the storage volume, the magnetic substance of the active magnetic regenerator being demagnetized when the cooling gas flows into the storage volume but magnetized when the cooling gas flows out of the storage volume. The second active magnetic regenerator therefore operates in counterphase to the first and leads to a further increase in refrigeration capacity per operating cycle.

It is advantageous for the magnetic substances of the active magnetic regenerators to be moved into a magnetic field for magnetization and withdrawn from this magnetic field for demagnetization. This may be achieved by using simple push rods or the like which dip into the refrigeration vessel in which the refrigeration load is disposed.

In this respect it is particularly favourable for the displacer piston and the magnetic substance of the active magnetic regenerator(s) to be displaced simultaneously. A particularly favourable aspect in this case is the fact that the frequency with which the Gifford-McMahon method is customarily carried out is compatible with the frequency of the cyclic magnetocaloric effect, i.e. both effects operate in this method at frequencies which are favourable for them.

In this respect it is favourable for the magnetic substances of the two active magnetic regenerators to be displaced by a coupled drive so that the forces of displacement partially compensate one another. When the magnetic substance is moved into the magnetic field and withdrawn therefrom again considerable forces have to be used. These forces may be compensated to a great extent when the drive for the two active magnetic regenerators is coupled and the counterphase operation as described is used. This may be realized particularly favourably in a counterphase arrangement in which one substance enters the magnetic field while the other substance exits from its associated magnetic field when the magnetic substances are simultaneously displaced in the same direction.

It is particularly favourable, when using two active magnetic regenerators, for a portion of the cooling gas to be conveyed so as to bypass the active magnetic regenerators and the refrigeration load. This will avoid any asymmetry in the arrangement which could result when the cooling gas which is flowing back from the storage volume into the regenerator is heated in the second active magnetic regenerator between refrigeration load and regenerator to such an extent that it is no longer possible to cool the regenerator of the Gifford-McMahon machine sufficiently for the next cycle. If, on the other hand, a portion of the cooling gas bypasses the magnetic regenerators and the refrigeration load, this partial flow is not heated by the second magnetic regenerator and can therefore cool the regenerator of the Gifford-McMahon machine sufficiently to allow the compressed cooling gas entering the machine during the next cycle to be adequately cooled.

A further object of the invention is to provide an apparatus of the type in question for performing this method.

This object is accomplished in accordance with the invention, for an apparatus of the type described at the outset, in that an active magnetic regenerator located between refrigeration load and storage volume and containing an alternately magnetizable and demagnetizable magnetic substance is in heat contact with the cooling gas and that a control means is provided for synchronizing the magnetization and demagnetization, respectively, of the magnetic substance with the alternating opening of the high-pressure inlet and the low-pressure outlet as well as with the oscillating displacement of the displacer piston.

In a preferred embodiment, an additional active magnetic regenerator is arranged between the regenerator chamber and the refrigeration load, the magnetic substance of this additional active magnetic regenerator being magnetizable by the control means in counterphase to the magnetic substance of the first active magnetic regenerator It is advantageous for the magnetic substances of the active magnetic regenerators to be adapted to be moved into a stationary magnetic field for magnetization and withdrawn from this magnetic field for demagnetization.

In this respect, it has proven advantageous for the magnetic substances of the two active magnetic regenerators to be mechanically coupled such that the displacement forces of the magnetic substances displaceable in counterphase partially compensate one another.

In a preferred embodiment, a bypass line is provided for bypassing the active magnetic regenerators and the refrigeration load.

The following description of preferred embodiments of the invention serves to explain the invention in greater detail in conjunction with the drawings, in which FIG. 1 is a schematic illustration of a Gifford-McMahon refrigeration machine with simple magnetocaloric refrigeration during inflow of the compressed cooling gas;

Figure 1:
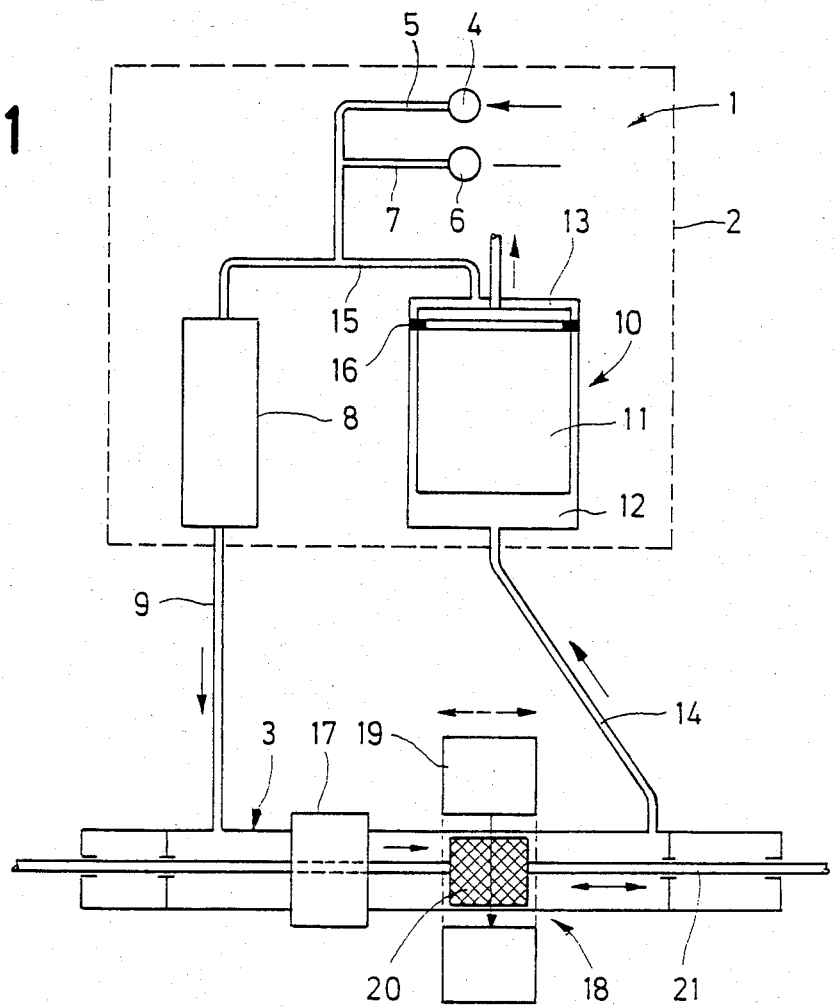

The drawings are very schematic illustrations of the respective refrigeration stages and show only those parts which are absolutely necessary for understanding the processes involved.

First of all, the refrigeration machine shown in FIGS. 1 and 2, which has a simple magnetocaloric refrigeration, will be described in more detail. The refrigeration machine comprises a primary stage 1, which is arranged in the drawings within the dashed line, as well as an actual refrigeration stage 3.

The primary stage has a high-pressure inlet 5 closable by means of a valve 4. This high-pressure inlet is connected to a high-pressure source for a cooling gas in a manner not shown in the drawings. Furthermore, the primary stage is provided with a low-pressure outlet 7 which is closable by a valve 6 and is connected to a cooling gas suction means which is also not illustrated in the drawings.

High-pressure inlet 5 and low-pressure outlet 7 jointly lead to one end of a regenerator chamber 8 which contains a regenerator material having a high heat storage and transmission capacity, for example metal wool or the like. At the opposite end, a connection line 9 leads out of the regenerator chamber 8 and into the interior of the cooling stage 3.

The primary stage 1 also includes a cylindrical storage chamber 10, in which a displacer piston 11 is mounted so as to be displaceable and sealed in relation to the storage chamber. The displacer piston divides the storage chamber 10 into two sections, namely a first section 12 and a second section 13. The section 12 forms a storage volume connected via a storage line 14 to the refrigeration stage 3. The section 13 is connected via a line 15 to the high-pressure inlet 5 and the low-pressure outlet 7 and thereby to one end of the regenerator chamber 8 as well. An annular seal 16, which separates the two sections 12 and 13 and is mounted on the displacer piston 11, is located in the immediate vicinity of the upper end of the displacer piston 11, i.e. immediately adjacent the section 13 at a relatively large distance from the section 12.

A refrigeration load 17 is arranged at the refrigeration stage 3 between the point where the connection line 9 opens into the refrigeration stage 3 and the point where the storage line 14 exits from the refrigeration stage 3. The refrigeration load 17 is in heat contact with the interior space of the refrigeration stage 3. In addition, an active magnetic regenerator 18, hereinafter referred to as AMR 18, is located between the refrigeration load 17 and the exit point of the storage line 14. This AMR comprises a superconductive magnet 19, which is located outside the refrigeration stage 3 and generates a magnetic field in the interior of the refrigeration stage 3 and preferably has the form of a piston mounted for displacement in the interior of the refrigeration stage parallel to the longitudinal direction thereof. The magnetic substance 20 may be displaced by means of push and pull rods 21 which are introduced into the refrigeration stage 3 from the outside in a sealed manner. Ferromagnetic materials are used as the magnetic substance 20, for example gadolinium. This material has flow channels for the cooling gas which enable the gas to flow through in the longitudinal direction of the refrigeration stage. These channels may either be worked into the piston-like magnetic substance 20 or the ferromagnetic material is used in a porous form so that the gas can flow through the pores in the magnetic material. It is essential that the gas is in good heat-conductive contact with the magnetic material when flowing therethrough.

The magnetic substance 20 may be moved into or withdrawn from the magnetic field generated by the magnet 19 by means of the push and pull rods 21.

Figure 2:
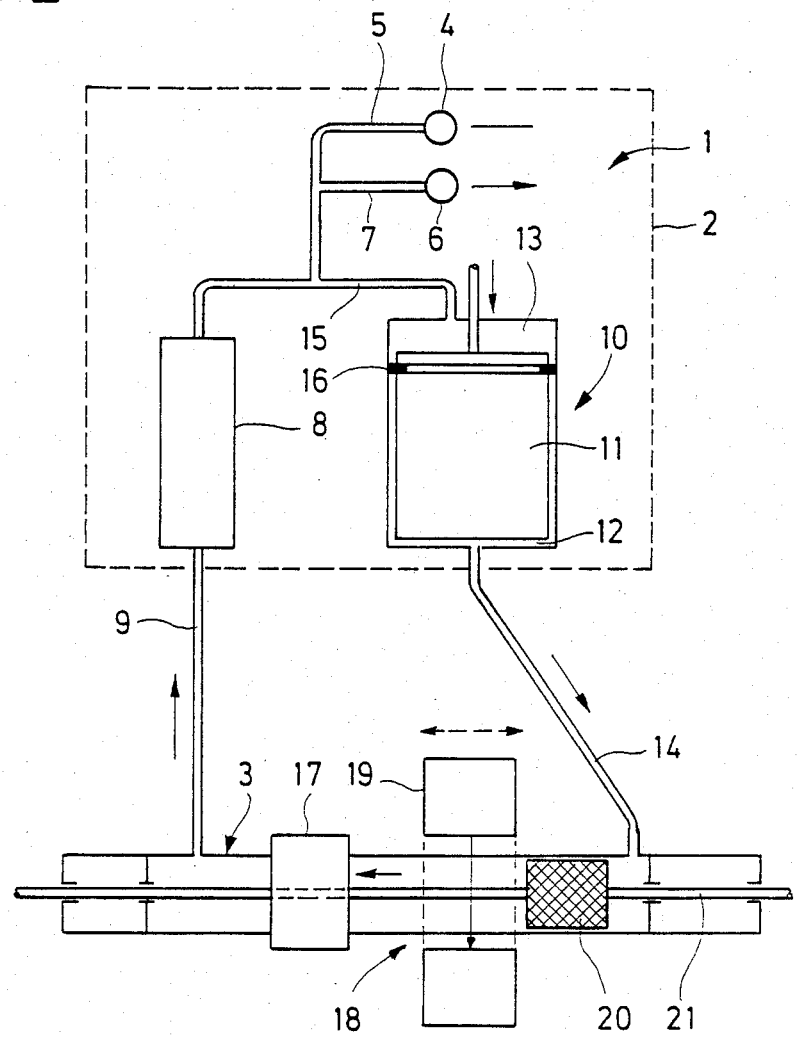
FIG. 2 is a view similar to FIG. 1 during outflow of the expanding cooling gas.

During operation of the apparatus illustrated in FIGS. 1 and 2, the valve 6 of the low-pressure outlet 7 is first closed while the valve 4 of the high-pressure inlet is open. Compressed cooling gas enters the system through this high-pressure inlet 5 and is cooled in the regenerator chamber 8 to a temperature resulting from the refrigeration capacity of the regenerator material in the regenerator chamber. The cooled, compressed cooling gas flows past the refrigeration load 17 and through the magnetic substance 20 which, in this phase, is located in the interior of the magnetic field so that the ferromagnetic material is magnetized. The cooling gas is heated as it passes through the magnetic substance 20. It then passes through the storage line 14 into the lower section 12 acting as storage volume. In this phase, the displacer piston 11 is displaced upwardly by an external drive, which is not illustrated in the drawings, such that the volume of section 12 is at its maximum and the volume of section 13 at its minimum (FIG. 1).

During this part of the cycle no refrigeration capacity is supplied to the refrigeration load 17.

During the next part of the cycle, the valve 4 of the high-pressure inlet 5 is closed. The magnetic substance 20 is withdrawn from the magnetic field and thereby cooled. In addition, the valve 6 of the low-pressure outlet 7 is opened so that the compressed cooling gas can flow out of the system to the suction means not illustrated in the drawings. This causes the cooling gas in the system to expand and cool. During expansion the cooling gas flows through the storage line 14 and the magnetic substance 20, in heat contact past the refrigeration load and through the regenerator chamber to the low-pressure outlet. This outflow movement is assisted by displacement of the displacer piston 11 so as to reduce the volume of section 12.

The cooling gas is cooled firstly due to expansion and, secondly, by passing through the cooled magnetic substance 20 and so the gas can supply refrigeration capacity to the refrigeration load 17 as it flows past. Moreover, the gas cools the regenerator material in the regenerator chamber as it passes through. This causes a temperature gradient in the interior of the regenerator chamber. The temperature is lower at the end of the regenerator chamber facing the refrigeration stage, once the expanded cooling gas has passed through, than at the opposite end. The cooling gas flows out, at the most, until a pressure balance is reached between the system and the suction source. The cooling gas flowing out through the low-pressure outlet 7 may be compressed again in a manner known per se outside the primary stage and cooled at the same time so that it may again be supplied to the system during the next cycle, via the high-pressure inlet and in the manner described above.

Once the cycle is completed the valve 6 of the low-pressure outlet is closed, the magnetic substance 20 is moved into the magnetic field again, the displacer piston 11 is moved into its upper position increasing the size of section 12 and, finally, the valve 4 of the high-pressure inlet 5 is opened. The cycle described above then begins anew.

The energy efficiency of this method is higher than in the Gifford-McMahon method used on its own or the magnetocaloric refrigeration effect used on its own. In addition, the constructional problems otherwise encountered with magnetocaloric refrigeration are avoided. The adaptation of the Gifford-McMahon method with magnetocaloric refrigeration is particularly favourable with a view to frequency and pressure ratios.

Figure 3:
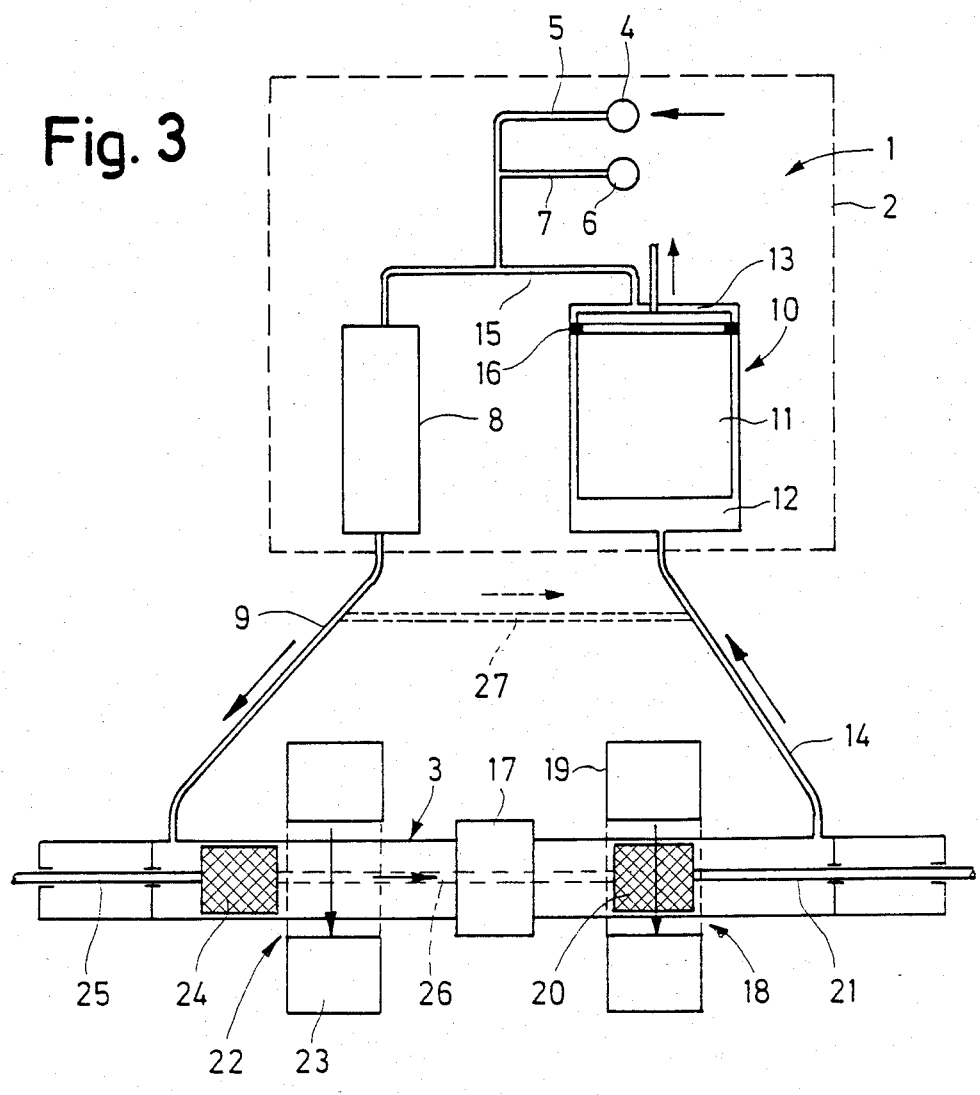
FIG. 3 is a view similar to FIG. 1 showing a magnetocaloric refrigeration apparatus operating in counterphase during inflow of the compressed cooling gas and FIG. 4 is a view similar to FIG. 3 during outflow of the expanding cooling gas.
Figure 4:
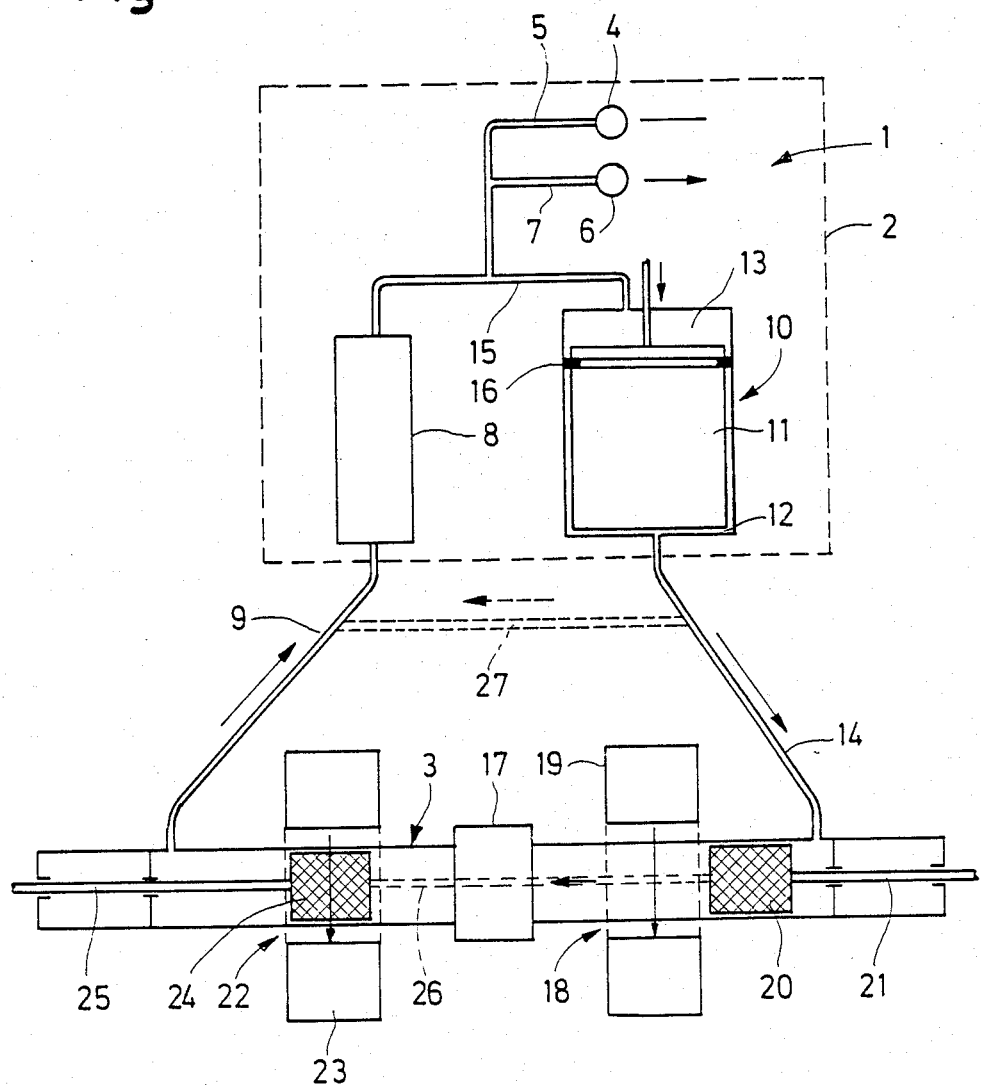

The apparatus illustrated in FIGS. 3 and 4 differs only slightly from the apparatus of FIGS. 1 and 2. Corresponding parts therefore have the same reference numerals.

In this embodiment, a second active magnetic regenerator 22, hereinafter referred to as AMR 22, is arranged between the point where the connection line 9 opens into the cryostat 3 and the refrigeration load 17. This AMR comprises a magnet 23 and a magnetic substance 24. The magnetic substance 24 has its own push and pull rod 25.

The two AMRs 18 and 22 are arranged so as to be in mirror symmetry to one another so that they can be withdrawn from their associated magnetic fields towards opposite sides.

In a preferred embodiment, the magnetic substances 20 and 24 are directly connected to one another via a further rod 26 which is illustrated in FIGS. 3 and 4 by dashed lines. Instead of this rod, a different mechanical coupling could be provided for the push and pull rods 21 and 25. Due to mechanical coupling, the magnetic substance of one AMR can be withdrawn from its associated magnetic field while the magnetic substance of the other AMR is being pushed into its associated magnetic field. Due to this counterphase coupling, the forces of displacement necessary to move the magnetic substances into and withdraw them out of their respective magnetic fields are compensated to a considerable extent.

The operation of this modified embodiment is exactly the same as for the arrangement of FIGS. 1 and 2, except that with the second AMR 22 the cooling gas can transfer refrigeration capacity to the refrigeration load 17 as it flows past this load during the first part of the cycle, i.e. when flowing into the storage volume, as the cooling gas is further cooled as it passes through the magnetic substance 24.

When the cooling gas is flowing back it may, however, be heated, while passing through the magnetic substance 24, to a greater extent than in the embodiment of FIGS. 1 and 2. This could result in the risk of asymmetry since the cooling gas, when flowing back, no longer cools the regenerator material in the regenerator chamber 8 to such an extent that the cooling gas flowing into the regenerator chamber during the next cycle can be preliminarily cooled to a sufficiently low level. To avoid this possible asymmetry, a bypass line 27 may be provided between the connection line 9 and the storage line 14. This bypass line 27 is illustrated in the drawings by dashed lines and bypasses the two AMRs 18 and 22 and the refrigeration load 17. That portion of the cooling gas flowing back through the bypass line 27 into the regenerator chamber 8 is colder than that portion flowing back through the connection line 9. This ensures that the regenerator material in the regenerator chamber 8 is cooled to an adequate extent.

The embodiment of FIGS. 3 and 4 is advantageous, above all, because the considerable forces required to displace the magnetic substances in the AMRs can be considerably reduced due to the counterphase compensation.

In both cases, the movements of the magnetic substances and the displacer piston are synchronized with the activation of the valves 4 and 6 by a control means not illustrated in the drawings and so the individual cycles are fully automatic. It is advantageous in this respect that no seals and valves are required in the interior of the refrigeration stage, i.e. in the cold region, and that only the magnetic substances themselves have to be displaced in this region. This completely avoids the constructional difficulties encountered in conventional methods and apparatuses due to the necessity of valves, seals and an increased number of movable parts at a low temperature.

What is claimed is:

1. A method of removing heat from a refrigeration load in a cyclically operated refrigerator apparatus, each cycle of the method comprising the steps of:
    cooling a compressed cooling gas from a high-pressure inlet by bringing it into heat contact with a regenerator cooled during the preceding cycle;
    conveying the cooled gas through the refrigeration load and into heat contact with a magnetized active magnetic regenerator (AMR);
    conveying the cooling gas through the AMR to a storage volume;
    closing the high pressure inlet, opening a low pressure outlet and demagnetizing the AMR;
    cooling the cooling gas by expanding it in the storage volume;
    conveying the cooling gas from the storage volume through the demagnetized AMR, where it is further cooled, to cool the refrigeration load;
    conveying the cooling gas from the refrigeration load into heat contact with the regenerator to cool the regenerator;
    conveying the cooling gas from the regenerator out through the low pressure outlet; and
    opening the high pressure inlet, closing the low-pressure outlet and magnetizing the AMR in preparation for the next cycle.

2. A method as defined in claim 1 including the steps of bringing the cooling gas into heat contact with a second AMR between the refrigeration load and the regenerator both when said gas is being conveyed into said storage volume and when said gas is being conveyed out of said storage volume, demagnetizing the magnetic substance of said second AMR when the cooling gas is conveyed into the storage volume, and magnetizing the second AMR when the cooling gas is conveyed out of the storage volume.

3. Method as defined in claim 2, wherein the step of magnetizing each AMR includes the step of moving the magnetic substance of the AMR into a magnetic field, wherein the step of demagnetizing each AMR includes the step of moving the magnetic substance of the AMR out of the magnetic field, and wherein the magnetic substances of the two AMRs are moved by a coupled drive so that the forces of displacement partially compensate one another.

4. Method as defined in claim 2, wherein the steps of conveying the cooling gas to and from the storage volume each include the step of conveying a portion of the cooling gas so as to bypass the AMRs and the refrigeration load.

5. A method as defined in claim 1 wherein the conveying of the cooling gas from the storage volume is accomplished at least in part by a displacer piston.

6. Method as defined in claim 5, wherein the step of magnetizing the magnetic substances of the AMR includes the step of moving the magnetic substance into a magnetic field, and wherein the step of demagnetizing the AMR includes the step of withdrawing the magnetic substance from said magnetic field.

7. Method as defined in claim 6, wherein the displacer piston and the magnetic substance of the AMR are displaced simultaneously.

8. Apparatus for removing heat from a refrigeration load, comprising: a closable high-pressure inlet for cooling gas, a closable low-pressure outlet for a cooling gas, a regenerator chamber, means for connecting one side of the regeneration chamber to the high-pressure inlet and the low-pressure outlet, a storage chamber divided into two sections by a displacer piston displaceable in said chamber, said sections being sealed from one another, one section forming a storage volume, means for connecting the other section to the high-pressure inlet and the low-pressure outlet, means for connecting the other side of the regenerator chamber to the refrigeraton load, an active magnetic regenerator (AMR) located between the refrigeration load and storage volume and containing an alternately magnetizable and demagnetizable magnetic substance in heat contact with the cooling gas, means for alternately opening the high-pressure inlet and the low-pressure outlet, and control means for synchronizing the magnetization and demagnetization, respectively, of the magnetic substance with the alternating opening of the high-pressure inlet and the low-pressure outlet as well as with the oscillating displacement of the displacer system.

9. Apparatus as defined in claim 8, including an additional AMR positioned between the regenerator chamber and the refrigeration load, the magnetic substance of said additional AMR being magnetizable by the control means in counterphase to the magnetic substance of the first AMR.

10. Apparatus as defined in claim 9, including a bypass line for bypassing the AMRS and the refrigeration load (17).

11. Apparatus as defined in claim 8, including a stationary magnetic field for each AMR, and wherein the magnetic substance of each AMR is adapted to be moved into the AMR's stationary magnetic field for magnetization and withdrawn from said magnetic field for demagnetization.

12. Apparatus as defined in claim 11, including means for mechanically coupling the magnetic substances of the two AMRs such that the displacement forces of the magnetic substances displaceable in counterphase partially compensate one another.

* * * * *